US006245856B1

(12) United States Patent
Kaufman et al.

(10) Patent No.: US 6,245,856 B1
(45) Date of Patent: *Jun. 12, 2001

(54) THERMOPLASTIC OLEFIN COMPOSITIONS

(75) Inventors: Lawrence George Kaufman, League City; Charles Cozewith, Bellaire; Avinash Chandrakant Gadkari, Houston, all of TX (US); Narayanaswami Raja Dharmarajan, Glenmont, NY (US); Maria Dolores Ellul, Silver Lake, OH (US)

(73) Assignee: Exxon Chemical Patents, Inc., Baytown, TX (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 35 days.

(21) Appl. No.: 09/094,995

(22) Filed: Jun. 15, 1998

Related U.S. Application Data

(63) Continuation-in-part of application No. 08/991,134, filed on Dec. 16, 1997, now abandoned.
(60) Provisional application No. 60/033,463, filed on Dec. 17, 1996.

(51) Int. Cl.[7] .............................. C08L 23/12; C08L 23/14
(52) U.S. Cl. ........................... 525/240; 525/88; 525/191; 526/351; 526/943
(58) Field of Search ................... 525/88, 89, 191, 525/240; 526/351

(56) References Cited

U.S. PATENT DOCUMENTS

| 4,792,595 | 12/1988 | Cozewith et al. | 526/348 |
|---|---|---|---|
| 4,989,436 | 2/1991 | Setzer et al. | 72/247 |
| 5,057,475 | 10/1991 | Canich et al. | 502/104 |
| 5,198,401 | 3/1993 | Turner et al. | 502/155 |
| 5,272,336 | 12/1993 | Moake | 250/261 |
| 5,278,272 | 1/1994 | Lai et al. | 526/348.5 |
| 5,324,800 | 6/1994 | Welborn, Jr. et al. | 526/160 |
| 5,674,613 | 10/1997 | Dharmarajan et al. | 428/378 |
| 5,681,897 | 10/1997 | Silvis et al. | 525/150 |
| 5,763,534 | * 6/1998 | Srinivasan et al. | 525/240 |

FOREIGN PATENT DOCUMENTS

| 0 646 624 A1 | 5/1995 | (EP) . |
|---|---|---|
| 0 751 182 | 1/1997 | (EP) . |
| 0 770 106 B1 | 2/1997 | (EP) . |
| WO 94/28034 | 12/1994 | (WO) . |
| WO 96/19533 | 6/1996 | (WO) . |
| WO 96/35751 | 11/1996 | (WO) . |
| WO 97/48538 | 12/1997 | (WO) . |

OTHER PUBLICATIONS

T. Yu and N. R. Dharmarajan, "Morphological Studies of Metallocene Plastomer Modified Polypropylenes", Soc. Plast. Eng., Proc. (ANTEC), pp. 2006–2013, May, 1996.
G. Ver Strate, C. Cozewith, and S. Ju, Macromolecules, v.21 (1988)—pp. 3360–3371—Near Monodisperse Ethylene–Propylene Copolymers by Direct Ziegler–Natta Polymerization. Preparation, Characterization, Properties.
Science and Technology of Rubber, F. Eirich, et al., ed., Academic Press (1978) New York—Chapter 3 by G. Ver Strate and D.J. Lohse, "Structure Characterization in the Science and Technology of Elastomers"—pp. 95–188.
ASTM D 256–93a—"Standard Test Methods for Determining the Pendulum Impact Resistance of Notched Specimens of Plastics"—American Society for Testing and Materials, Oct. 15, 1993.
ASTM D 412–97—"Standard Test Methods for Vulcanized Rubber and Thermoplastic Rubbers and Thermoplastic Elastomers—Tension"—American Society for Testing and Materials, Jul. 10, 1997.
ASTM D 790–96a—"Standard Test Methods for Flexural Properties of Unreinforced and Reinforced Plastics and Electrical Insulating Materials"—American Society for Testing and Materials, Apr. 10, 1996.
ASTM D 1238–95—"Standard Test Method for Flow Rates of Thermoplastics by Extrusion Plastomer"—American Society for Testing and Materials, Nov. 10, 1995.
ASTM D 1648–86—"Standard Specification for Basic Lead Silicochromate Pigment"—American Society for Testing and Materials, Apr. 25, 1986.
ASTM D 3900–95—Standard Test Methods for Rubber Raw—Determination of Ethylene Units in EPM (Ethylene–Propylene Copolymers) and EPDM (Ethylene–Propylene–Diene Terpolymers)—American Society for Testing and Materials, Feb. 15, 1995.
ASTM D–6047–96—"Standard Test Methods for Rubber, Raw—Determination of 5–Ethylidenenorbornene (ENB) in Ethylene–Propylene–Diene (EPDM) Terpolymers"—American Society for Testing and Materials, Nov. 10, 1996.

* cited by examiner

Primary Examiner—James J. Seidleck
Assistant Examiner—Olga Asinovsky (57) ABSTRACT

The invention relates to novel Thermoplastic Olefin compositions comprising polypropylene, and ethylene-alpha olefin elastomer and a compatabilizer comprising an ethylene-propylene copolymer having a propylene content of greater than 80 weight percent. The ethylene-propylene copolymer compatabilizer imparts a greater degree of compatibility between the polypropylene and elastomer phases yielding improved physical properties.

16 Claims, 5 Drawing Sheets

FIG. 1A
Branched EPDM

FIG. 1B
Br. EPDM/ m-EP

FIG.4A
Br. EPDM

FIG.4B
Br. EPDM/ m-EP

FIG.4C
Br. EPDM

FIG.4D
Br. EPDM/ m-EP

THERMOPLASTIC OLEFIN COMPOSITIONS

This is a Continuation-in-Part of U.S. Ser. No. 08/991,134 filed Dec. 16, 1997 abandoned, which is based on Provisional Application, U.S. Ser. No. 60/033,463 filed Dec. 17, 1996.

BACKGROUND OF THE INVENTION

The invention relates to novel Thermoplastic Olefin compositions comprising polypropylene, and ethylene-alpha olefin elastomer and a compatabilizer comprising an ethylene-propylene copolymer having a propylene content of greater than 80 weight percent. The ethylene-propylene copolymer compatabilizer imparts a greater degree of compatibility between the polypropylene and elastomer phases yielding improved physical properties.

Thermoplastic Olefin Compositions (TPOs) are defined as blends of polypropylene, olefinic elastomers and optionally fillers and other compounding ingredients. TPOs are multiphase polymer blends where the polypropylene forms a continuous matrix phase and the elastomer and fillers are the dispersed components. The polypropylene matrix imparts tensile strength and chemical resistance to the TPO while the elastomer imparts flexibility and impact resistance.

Traditionally, ethylene-propylene copolymers (EP) and ethylene-propylene-diene terpolymers (EPDM) have been used as the elastomeric component in TPOs. Recently, other ethylene-alpha olefin copolymers have been used, especially ethylene-butene and ethylene-octene copolymers.

The major market for TPOs is in the manufacture of automotive parts, especially bumper fascia. These parts are generally made using injection molding processes. To increase efficiency and reduce costs it is necessary to decrease molding times and reduce wall thickness in the molds. To accomplish these goals, manufacturers have turned to high melt flow polypropylenes (Melt Flow Rate>35). These high melt flow rate (MFR) resins are difficult to toughen, resulting in products that have low impact strength.

One of the reasons impact modification of high MFR polypropylene resins is difficult is because of the large differences in the melt viscosities between the polypropylene resins employed and the elastomers typically used as impact modifiers. These differences lead to a poor dispersion of the elastomer in the polypropylene matrix, resulting in large dispersed elastomer particle sizes which, in turn, is detrimental to overall impact strength.

One proposed solution to the problem has been to decrease the molecular weight of the elastomer used, in order to reduce the viscosity of the elastomer. While this route produces better dispersion of the elastomer in the polypropylene matrix, the reduced molecular weight of the modifier adversely affects the impact strength of the TPO.

Another proposed solution has been to develop products which behave like a low viscosity plastic during the mixing process, yet function like an elastomer in the molded TPO. These type of polymers are generally referred to as plastomers. To date, however, these plastomer products have not yielded satisfactory impact performance when used with high melt flow polypropylene.

A third area that has been explored is the use of branched elastomers. U.S. Pat. No. 5,681,897 discloses the use of substantially linear ethylene-alpha olefin copolymers having a degree of long chain branching as impact modifiers for polypropylene as well as other thermoplastic resins. While the use of these elastomers appears to lead to an improvement in impact strength, there is still a need for impact strength and flexibility in TPOs made with high MFR polypropylene resins.

SUMMARY OF THE INVENTION

The thermoplastic olefin compositions of the present invention are prepared by blending a high melt flow rate (MFR) polypropylene resin with an ethylene-alpha olefin elastomer and compatabilizer comprising an ethylene-propylene copolymer having a propylene content of greater than 80 weight percent. It has been found that the high propylene content copolymer acts as a compatabilizer between the polypropylene phase and the elastomeric phase resulting in excellent dispersion of the elastomer throughout the polypropylene matrix.

The polypropylene phase of the TPO comprises polypropylene homopolymer having a relatively high melt flow rate (MFR). Specifically the MFRs should range from about 20 to 100 with a MFR of 35 to 70 preferred. The polypropylene component will typically comprise 88 to 50 weight percent of the TPO with a polypropylene content of 65 to 75 weight percent preferred and a polypropylene content of 70 weight percent most preferred.

The elastomer component of the TPO comprises either an ethylene-$C_3$ to $C_{20}$ alpha olefin copolymer or an ethylene-alpha olefin-diene terpolymer. The elastomer generally will have a number average molecular weight of from 30,000 to 500,000 with a range of 50,000 to 100,000 preferred. The ethylene content of the elastomer will generally range from 45 to 90 weight percent with 45 to 65 weight percent preferred. The elastomers will have a density of from 0.85 to 0.90 gm/cm$^3$. Proportionally, the elastomeric component of the TPO comprises 10 to 50 weight percent with 20 to 40 weight percent preferred.

Lastly, the ethylene propylene copolymer compatabilizer will have a number average molecular weight of from 40,000 to 300,000 with 80,000 to 200,000 being preferred. The compatabilizers will generally have a molecular weight distribution (MWD) of from 1.8 to 4.5 with from 2 to 3 preferred. The propylene content will vary from 80 to 92 weight percent with 83 to 91 weight percent preferred and 85 to 90 weight percent most preferred. The preferred copolymers will exhibit a crystallinity of from about 2 to 65% of that of isotactic homopolypropylene, preferably about 5 to 40%. When used as a compatabilizer in TPOs, the high propylene copolymer will be employed in a range of from 2 to 15 weight percent with 3 to 7 weight percent preferred.

Other materials typically used in the preparation of TPOs, such as fillers and the like, can also be used in the practice of the invention.

BRIEF DESCRIPTION OF THE DRAWINGS

FIG. 1 is a photomicrograph showing the dispersion of elastomer in a 70 MFR polypropylene mixture.

FIG. 2 is a set of TEM images of TPO compositions with and without the compatabilizer of the invention.

FIG. 3 is a schematic diagram of a section of TPO following a notched Izod impact test.

FIG. 4 is a series of photomicrographs of TPO compositions exhibiting fracture after impact.

DETAILED DESCRIPTION OF THE INVENTION

The Polypropylene Component

As with traditional TPOs the major component of the TPOs of the invention comprises polypropylene, preferably, isotactic polypropylene. In practice, the polypropylene will comprise between 90 and 50 weight percent of the total TPO composition with between 75 and 65 weight percent preferred. The polypropylene should have an MFR of at least 20 up to about 100, preferably 35 to 75 and more preferably 70.

The polypropylenes used in the practice of the invention can be prepared using any known technology for the production of polypropylene. This includes the use of traditional Ziegler-Natta catalyst systems as well as new catalyst systems such as metallocene catalyst systems such as those exemplified in PCT WO Patent 94/28034. As isotactic polypropylene is generally used in TPO applications, catalyst systems which yield predominately isotactic polypropylene are preferred. In addition, polypropylene impact copolymers, as well as reactor TPOs, may be used.

Typical isotactic polymers which can be used in the practice of the invention include Escorene® 1105 (MFR= 35) made by Exxon Chemical Company, as well as Development Grade PP 19067-002-01 (MFR=70), also made by Exxon Chemical Company. Impact copolymers useful in the practice of the invention include Escorene® PD 7035 (MFR=35) and PD 7194 (MFR=20), both manufactured by Exxon Chemical Company.

The Elastomeric Component

The elastomeric component comprises either ethylene/alpha-olefin copolymers or ethylene/alpha-olefin/diene terpolymers which impart flexibility and impact strength to the polypropylene matrix. The elastomeric component is present in the TPO in an amount ranging from 10 to 50 weight percent based on the total composition with from 20 to 40 weight percent preferred.

In the case of ethylene/alpha-olefin copolymers, the alpha-olefin is selected from the group consisting of $C_3$ to $C_{20}$ alpha olefins with propylene, butene, hexene, and octene preferred and propylene most preferred. The ethylene content of the copolymers ranges from 90 to 45 weight percent with 65 to 45 weight percent preferred. The number average molecular weight of the polymers can range from 30,000 to 500,000 with from 50,000 to 100,000 preferred. The density of the elastomers shall generally range from 0.85 to 0.90 gm/cm$^3$.

For elastomeric terpolymers of the invention, the alpha olefin is again selected from the group consisting of $C_3$ to $C_{20}$ alpha olefins with propylene, butene and octene preferred and propylene most preferred. The diene component is selected from the group consisting of $C_4$ to $C_{20}$ dienes. The preferred are non-conjugated dienes. Examples of suitable dienes include straight chain, hydrocarbon di-olefin or cylcloalkenyl-substituted alkenes having from 6 to 15 carbon atoms. Specific examples include (a) straight chain acyclic dienes such as 1,4-hexadiene and 1,6-octadiene; (b) branched chain acyclic dienes such as 5-methyl-1,4-hexadiene; 3,7-dimethyl-1,6-octadiene; 3,7-dimethyl-1,7-octadiene; and the mixed isomers of dihydro-myricene and dihydro-ocinene; (c) single ring alicyclic dienes, such as 1,3 cyclopentadiene; 1,4-cyclohexadiene; 1,5-cyclooctadiene and 1,5-cyclododecadiene; (d) multi-ring alicyclic fused and bridged ring dienes such as tetrahydroindene; methyl-tetrahydroindene; dicyclopentadiene (DCPD); bicyclo-(2.2.1)-hepta-2,5-diene; alkenyl, alkylidene, cycloalkenyl and cycloalkylidene norbornene, such as 5-methylene-2-norbornene (MNB), 5-propenyl-2-norbornene, 5-isopropylidene-2-norbornene, 5-ethylidene-2-norbornene (ENB), 5-(4-cyclopentenyl)-2-norbornene, 5-cyclohexylidene-2-norbornene, and 5-vinyl-2-norbornene (VNB); (e) cycloalkenyl-substituted alkenes, such as allyl cyclohexene, vinyl cyclooctene, allyl cyclodecene, vinyl cyclododecene. Of the non-conjugated dienes typically used, the preferred dienes are dicyclopentadiene, 1,4-hexadiene, 5-methylene-2-norbornene, and 5-ethylidene-2-norbornene. Particularly preferred diolefins are 5-ethylidene-2-norbornene; 1,4-hexadiene, dicyclopentadiene and 5-vinyl-2-norbornene. Note that throughout this specification the terms "non-conjugated diene" and "diene" are used interchangeably.

The terpolymers may have an ethylene content of from 80 to 45 weight percent with 65 to 45 weight percent preferred. The alpha olefin content may range from 20 to 55 weight percent, with 30 to 55 weight percent preferred. Finally, the diene content may range from 0.5 to 10 weight percent with 0.5 to 7 weight percent preferred.

As with the copolymers described above, the number average molecular weight of the terpolymers can range from 30,000 to 500,000 with from 50,000 to 100,000 preferred.

The elastomers used in the practice of the invention can be linear, substantially linear, blocky or branched. Of these, branched elastomers are preferred as they produce the highest impact strength when compared to other elastomers of equivalent Mooney viscosity.

The presence and degree of branching are determined from molecular weight measurements. Molecular weights are measured using both conventional gel permeation chromatography with a differential refractive index detector (DRI) and Low Angle Laser Light Scattering (LALLS) detector. Lower moments of the molecular weight distribution, such as number average molecular weight ($M_n$), are obtained using DRI. Higher moments, weight average molecular weight ($M_w$) and Z average ($M_z$) molecular weights, are obtained from Light Scattering.

The relative degree of branching is quantified using the branching index [BI]. This index is calculated from measured values of (i) $M_{w,\ LALLS}$ (ii) $M_{w,\ DRI}$ (iii) viscosity average molecular weight $M_{v,\ DRI}$ and (iv) inherent viscosity (IV) measured in decalin at 135° C. The branching index is defined by $$BI=(M_{v,br}\ M_{w,DRI})/(M_{w,LALLS}\ M_{v,\ DRI}) \qquad (1)$$

where $M_{v,br}=k\ (IV)^{1/a}$ and 'a' is the Mark-Houwink constant (=0.759 for EP(D)M in decalin at 135° C.). The branching index for a linear polymer is 1.0, and for branched polymers, the extent of branching is defined relative to a linear polymer. For a medium branched polymer, the branching index ranges from 0.5 to 0.7, while for highly branched polymers BI values range from 0.1 to 0.3.

Linear elastomers can be prepared using a conventional polymerization process including traditional Ziegler-Natta catalysts as well as metallocene catalysts. Substantially linear polymers are described in U.S. Pat. Nos. 5,272,336 and 5,278,272. Branched elastomers can be made in a similar fashion as disclosed in U.S. Pat. No. 5,674,613, which is incorporated by reference for U.S. practices. Block copolymers can be manufactured using the technique described in U.S. Pat. No. 4,792,595, the teaching of which is incorporated herein for U.S. practices and include Vistalon® 878 and MDV 91-9 made and sold by Exxon Chemical Company.

THE HIGH PROPYLENE COPOLYMER COMPATABILIZER

The high propylene copolymer compatabilizer used in this invention is based on a novel class of compounds consisting of ethylene/propylene elastomers having a propylene content at least 80 weight percent up to 92 weight percent. Preferably, the propylene content may range from 83 to 91 weight percent with 85 to 90 weight percent most preferred. Number average molecular weight of the copolymer range from 40,000 to 300,000 with from 80,000 to 200,000 preferred. The copolymers will have a molecular weight distribution defined by a ratio, a weight to number average molecular weight of from 1.8 to 4.5 with from 2 to 3 preferred. The copolymers are random copolymers of ethylene and propylene having long sequences of propylene monomers interrupted by ethylenes. These copolymers act as compatibilizers between the polypropylene matrix and the elastomer component resulting in better dispersion of the elastomer throughout the polypropylene matrix. This increased dispersion, in turn, results in improved impact strength as well as other physical properties.

The propylene content of the copolymers is such that as contrasted with conventional ethylene/propylene copolymers, the copolymers exhibit a high degree of tacticity in the propylene regions, i.e., the copolymers may have isotactic or syndiotactic regions. While any copolymer may be used in the practice of this invention, those copolymers having isotactic regions are most preferred. The use of copolymers with isotactic regions results in TPOs with superior impact strength both at room temperature and down to at least −30° C. The presence of isotactic sequences in the copolymer can be determined by examining the crystallinity of the copolymer. The preferred copolymers of the invention should have a crystallinity of from about 2% to about 65% that of isotactic homopolypropylene, preferably between 5% and 40%, as measured by the heat of fusion of annealed samples of polymer.

Generally, without limitation of the scope of the invention, one means for preparing the high propylene copolymers useful in this invention is as follows: (1) ethylene and propylene are introduced into a stirred tank reactor, (2) the catalyst system is introduced via nozzles, (3) solvent is fed to the reactor, (4) the reactor contains a liquid phase composed of propylene, together with ethylene, optional diene, solvent and polymer, (5) the reactor temperature and pressure may be controlled via autorefrigeration, as well as by cooling coils, jackets, feed regulation, etc., (6) the polymerization rate is controlled by the concentration of catalysts, monomer and temperature, and (7) the ethylene content of the polymer product is determined by the ratio of ethylene to propylene in the reactor, which is controlled by manipulating the feed rates of these components into the reactor.

For example, a typical polymerization consists of a polymerization in the presence of a catalyst system comprising a cyclopentadienyl-containing transition metal compound (hereinafter referred to as a metallocene) and an activator. Illustrative of the metallocenes useful in the preparation of the high propylene copolymers used in this invention are described in U.S. Pat. No. 5,324,800, the teachings of which are hereby incorporated by reference for U.S. practices. Of these, metallocene catalysts which impart a high degree of isotacticity in the final product are preferred. Catalysts meeting this requirement include the chiral metallocene catalysts described in U.S. Pat. No. 5,198,401, the teachings of which are hereby incorporated by reference for U.S. practice. Activator which can be used as part of the catalyst system include alumoxanes and non-coordinating anion compounds. Of these, the non-coordinating anion activators are preferred.

The alumoxane activator is preferably used in an amount to provide a molar aluminum to metallocene ratio of from about 1:1 to 20,000:1 or more. The non-coordinating anion activator is preferably used in an amount to provide a molar ratio of metallocene to non-coordinating anion of from 10:1 to about 1:1. The above polymerizations are conducted in the present of the catalyst system at a temperature of from about −100° C. to about 300° C. for a time of from about 1 second to about 10 hours to produce a copolymer having a weight average molecular weight of from 40,000 to 300,000 and a molecular weight distribution of from 1.8 to about 4.5.

While the process used to prepare the high propylene copolymer includes using a catalyst in the liquid phase, (slurry, solution, suspension or bulk phase or combination thereof), according to other embodiments, high pressure fluid phase or gas phase polymerization processes may also be used. When using a gas phase or suspension polymerization process, the catalyst system will generally employ supported catalyst. See, for example, U.S. Pat. No. 5,057,475, the teaching of which is hereby incorporated by reference for U.S. practices. Such catalyst systems can also include other well-known additives such as, for example, scavengers. These processes may be employed without limitation on the type of reaction vessels and the mode of conducting the polymerization. As stated above, and while it is also true for systems utilizing a supported catalyst system, the liquid phase process comprises the steps of contacting ethylene and propylene with a catalyst system in a suitable polymerization diluent and reacting the monomers in the presences of the catalyst system for a time and at a temperature sufficient to produce an ethylene/propylene copolymer of the desired molecular weight and composition.

The compatabilizers of the invention are generally used in an amount ranging from 2 to 15 weight percent of the TPO composition with from 3 to 7 weight percent preferred.

PREPARATION OF THE THERMOPLASTIC OLEFIN COMPOSITION

The TPOs of the present invention can be prepared by any conventional method currently employed in the manufacture of TPOs. The individual components can be separately manufactured and mechanically blended together. In addition, two or more of the components can be prepared in a reactor blend.

In the case of physical blends, the components are combined in a mechanical mixer, such as a BR Banbury mixer and mixed at high intensity. Mixing intensity is controlled until the polypropylene component melts (or fluxes) and forms a homogenous mixture. Mixing is continued for 2 minutes after flux of the polypropylene and the intensity is regulated such that the batch temperature does not exceed 210° C. The compound is then discharged from the mixer and finished using conventional finishing techniques.

It is also possible to combine two or more components as a reactor blend. This is preferably accomplished using a series of reactors when each component is prepared in a separate reactor and the reactant is then transferred to another reactor where a second component is prepared.

EXAMPLES

The invention is described in more detail, though only by way of illustration, in the following examples.
The Polymers Used
The polypropylene used in the examples which follow are commercially available polypropylene homopolymers manufactured by Exxon Chemical Company and sold under the trade name Escorene® 1105 (MFR=35) and Developmental Grade 19067-002-01. The homopolymers are produced using traditional Ziegler-Natta catalysts and have the properties recited in Table I.

TABLE I

Polypropylene Characteristics

| | | Escorene ® PP 1105 | 19062-002-001 |
|---|---|---|---|
| Melt Flow Rate @ 230° C. | gm/10 min. | 35 | 70 |
| Notched Izod Impact @ 23° C. | J/m | 21 | 18 |
| Flexural Modulus 1% Secant | MPa | 1172 | 1875 |
| Tensile Strength @ Yield | MPa | 31 | 39 |
| Elongation @ Yield | % | 12 | 14 |
| Heat Distortion Temperature @ 0.46 MPa | ° C. | 99 | 118 |

The Elastomers

The elastomers used in the following examples were prepared from traditional catalyst systems. Vistalon® 606 and Vistalon® 878 are ethylene-propylene copolymers made and sold by Exxon Chemical Company. Royalene® 521 is an ethylene-propylene-diene terpolymer made and sold by Uniroyal. Elastomers 6-1 and 7-2 are developmental ethylene-propylene-diene terpolymers. These terpolymers are highly branched. The composition and physical characteristics of the elastomers are summarized in Table II.

TABLE II

Elastomer Characteristics

| Polymer | | Vistalon® 878 | Vistalon® 606 | 6-1 | 7-2 | Royalene® 521 |
|---|---|---|---|---|---|---|
| ML (1 + 4) @ 125° C. | MU | 52 | 65 | 54 | 38 | 26 |
| Ethylene | wt % | 60 | 60 | 57.5 | 57 | 56 |
| ENB | wt % | — | — | 3.1 | — | 5.5 |
| VNB | wt % | — | — | — | 1.5 | — |
| MLR | | — | — | 333 | 375 | 121 |
| Mn (DRI) | x1000 | 101 | 97 | 70 | 50 | 45 |
| Mw (LALLS) | x1000 | 170 | 280 | 202 | 405 | 227 |
| Mw/Mn | | 1.7 | 2.9 | 2.9 | 8.1 | 5.0 |
| Branching | | linear/block | linear | Branched | Branched | Branched |

The Compatabilizers

The compatabilizers used in the examples were produced as described below.

Polymerizations were carried out in a one liter stirred reactor with continuous flow of feeds to the system and continuous withdrawal of products. Solvent (hexane) and monomers (ethylene, propylene, and ENB) were purified over beds of alumina and mole sieves. Toluene for preparing catalyst solutions was also purified by the same technique. All feeds were pumped into the reactors by metering pumps except for the ethylene which flowed as a gas under its own pressure through a mass flow controller. Reactor temperature was controlled by circulating water through a reactor cooling jacket. The reactor was maintained at a pressure in excess of the vapor pressure of the reactant mixture to keep the reactants in the liquid phase. The reactor was operated liquid full. Reactor residence time was 16–19 min.

Ethylene and propylene feeds were combined into one stream and then mixed with a prechilled hexane stream that had been cooled to 0° C. If ENB was used, it was also fed into the hexane stream upstream of the other monomers. A hexane solution of triisobutyl aluminum or tri(n-octyl) aluminum scavenger was added to the combined solvent and monomer stream just before it entered the reactor to further reduce the concentration of any catalyst poisons. The aluminum alkyl/metallocene molar ratio was typically 10–100. Polymerization was carried out with the bis-cyclopentadienyl chiral catalyst, dimethylsily-bisindenyl hafnium dichloride catalyst mixed with N,N-dimethylanilinium tretakis(penta fluorophenyl) boron (DMPFB) as activator. The catalyst components were dissolved in toluene in a 1/1 molar ratio. A mixture of the catalyst components in toluene was pumped to the reactor at a metered rate and entered through a separate port.

The polymer solution exited the reactor through a pressure control valve that reduced the pressure to atmospheric. This caused the excess monomers in the solution to flash into a vapor phase which was vented from the top of a vapor liquid separator. The liquid phase flowed out the bottom of the separator and was collected for polymer recovery. Polymer was recovered from solution by either steam stripping following by drying or by solvent evaporation under heat and vacuum.

The polymer was characterized to give Mooney viscosity (by Mooney Viscometer, ASTM D1648), ethylene content (by FTIR, ASTM D3900), ENB content (by FTIR, ASTM D6047), melt temperature and/or glass transition temperature (by DSC, described herein), and molecular weight (by GPC, described herein). Analysis of the second reactor polymer represents the properties of the overall polymer blend.

Gel Permeation Chromatography (GPC) techniques that were used to characterize the products of this invention have been described in several publications, notably U.S. Pat. No. 4,989,436 which is incorporated for purposes of U.S. patent practice. Molecular weight and composition measurements are described in G. Ver Strate, C. Cozewith, S. Ju, *Macromolecules*, 21, 3360 (1988) which is incorporated by reference for purposes of U.S. patent practice. The variety of other techniques used are soundly based in polymer structure characterization as described in "Structure Characterization, The Science and Technology of Elastomers", F. Eirich, editor, Academic Press (1978), Chapter 3 by G. Ver Strate. Differential scanning calorimetry (DSC) that was used to characterize the products of this invention has a standard protocol of loading a calorimeter at 20° C. with a specimen free of molding strains, cooling the sample to −75° C., scanning to 180° C. at 10° C./min., cooling to −75° C., and rerunning the scan. The Tm and heat of fusion are evaluated based on the measurements from the first melt. In some cases, low melting crystallinity will not be seen on the second scan as it may take many hours to develop even at low temperatures.

Samples of the polymer solution from the reactor was analyzed for polymer concentration. From this measurement and the reactor feed rates, the polymerization rate could be determined by material balances. Monomer conversions were then calculated from the polymerization rate and polymer composition data.

The composition and physical characteristics of the compatabilizers are reflected in Table III.

TABLE III

Compatabilizer Characteristics

| Compatabilizer | | A | B | C | D | E | F |
|---|---|---|---|---|---|---|---|
| ML (1 + 4) @ 125° C. | MU | 33 | 19 | 21 | 26 | 31 | — |
| Ethylene | wt % | 12.4 | 13 | 13 | 11 | 9 | 8.5 |
| Mn (DRI) | x1000 | 65 | 52 | 128 | 137 | 143 | 165 |
| Tm | ° C. | 54 | 50 | 47 | 68 | 79 | 92 |
| Mw/Mn | — | 1.95 | 2.03 | 1.84 | 1.89 | 1.94 | 1.95 |
| HOF | 0% | 17.9 | 29.6 | 21.5 | 39.1 | 54.4 | 53.5 |

HOF = Heat of Fusion

Preparation of the TPOs

The TPO compositions were formulated in a BR Banbury mixer using a batch size of 1260 grams. The relative proportions of the polymer components are reflected in Tables. All the polymer components were simultaneously charged into the Banbury chamber and were mixed at 85 RPM motor speed. The temperature inside the mixing chamber was allowed to rise above the melting point of the polypropylene component (165° C.) at which point the polypropylene melts (fluxes) and forms a homogeneous mixture. Mixing was continued for 2 minutes after the flux point of the polypropylene and the rotor speed was adjusted so that the batch temperature of the TPO composition did not exceed 200° C. The compositions were then discharged from the Banbury and then ground into pellets. Standard test specimens, as required by ASTM methods, were prepared by injection molding using a 75 ton Van Dorn injection molding equipment. Physical properties of the various samples were measured as described in Table V below. The Exxon Test Method is described in T. Yu and N. R. Dharmarajan "Preparation and Morphological Studies of Metallocene Plastomers Modified Polypropylene Blends", Soc. Plast. Eng., Proc. (ANTEC), May, 1996.

TABLE IV

Standard Test Methods

| TEST | METHOD |
|---|---|
| Notched Izod Impact (J/m) Room Temperature −30° C. | ASTM D 256 |
| Flexural Modulus (MPa) | ASTM D 790 |
| Tensile Strength (MPa) | ASTM D 412 |
| Elongation (%) | ASTM D 412 |
| Melt Flow Rate (gm/10 min) | ASTM D 1238 Condition L |
| Instrumented Impact Test ( ) | Exxon |

(N) The nozzle, front and rear temperatures of the injection press were maintained at 190° C. The mold temperature was kept at 27° C.
(C) The total cycle time was 54 sec. and the injection pressure was 4 MPa. A family mold containing various ASTM specimen cavities was used.

Various TPO compositions were prepared in accordance with the procedure outlined above to examine what effect different combinations of polymers have on the TPO characteristics. In the first series of tests, reported in Table V, Examples 1–6, a series of TPO compositions were prepared using a polypropylene homopolymer having an MFR of 35. In Example 1, Compatabilizer A is used by itself as an impact modifier. Examples 2 and 3 show the effect this compatabilizer has in combination with a branched elastomer. As seen in Table V, Example 4 shows improved melt flow when compared with Example 2 having no compatabilizer. Examples 4 and 5 also illustrate the compositions of the invention. Example 4 comprises a polypropylene homopolymer with a highly branched elastomer modifier. No compatabilizer is present. Example 5 is the same combination but with 10 weight percent of compatabilizer substituting for the branched elastomer. Again, the addition of the compatabilizer significantly improves the melt flow of the composition while leaving the other TPO properties unaffected.

Example 6 is a comparative example formulated with Uniroyal's Royalene® 521, a commercially available EPDM elastomer. As shown in Table V, the resulting TPO has good physical properties but reduced melt flow as compared to Examples 3 and 5.

TABLE V

TPO Compositions in 35 MFR iPP Homopolymer Compositions

| EXAMPLE | | 1 | 2 | 3 | 4 | 5 | 6 |
|---|---|---|---|---|---|---|---|
| PP 1105 (35 MFR) | wt % | 70 | 70 | 70 | 70 | 70 | 70 |
| Elastomer | | | | | | | |
| 6-1 | | — | 30 | 20 | — | — | — |
| 7-2 | | — | — | — | 30 | — | — |
| 521 | | — | — | — | — | — | 30 |
| Compatibilizer | | | | | | | |
| A | | 30 | — | 10 | — | 10 | — |
| Irganox ® 1010 | | 0.2 | 0.2 | 0.2 | 0.2 | 0.2 | 0.2 |
| Notched Izod Impact | J/M | | | | | | |

TABLE V-continued

TPO Compositions in 35 MFR iPP Homopolymer Compositions

| EXAMPLE | | 1 | 2 | 3 | 4 | 5 | 6 |
|---|---|---|---|---|---|---|---|
| 21° C. | | 91 | 4.49 | 578 | 567 | 615 | 567 |
| −30° C. | | 16 | 64 | 80 | 80 | 75 | 59 |
| Gardner Impact @ −29° C. | | (+) | (+) | | (+) | | (+) |
| Total Energy | J | | | 30 | | 35 | |
| Failure type | | B | B | B/D | D | D | D |
| Flexural Modulus @ 13 mm/min | | | | | | | |
| 1% Secant | MPa | 538 | 724 | 676 | 752 | 614 | 669 |
| Tangent | | 552 | 724 | 696 | 793 | 641 | 683 |
| Tensile Strength @ 51 mm/min | | | | | | | |
| Yield | MPa | 73 | 6.2 | 6.7 | 6.1 | 6.4 | 6.0 |
| Break | | * | 5.0 | 6.2 | 6.2 | 6.8 | * |
| Elongation @ 51 mm/min | % | | | | | | |
| Yield | | 38 | 14 | 24 | 16 | | 34 |
| Break | | * | 511 | 1014 | 705 | | * |
| Melt Flow Rate | g/10 min | 32.2 | 11.9 | 18.3 | 12.0 | 19.2 | 15.2 |
| Mold Shrinkage | % | 1.18 | 1.16 | 1.27 | 1.16 | 1.10 | 1.06 |

* no break during test duration.
(+) : Instrumented impact test data, −30° C. and 8 kmph
B = Brittle Failure
D = Ductile Failure

EXAMPLES 7 TO 13

Examples 7 through 13 were prepared using a polypropylene homopolymer having an MFR of 70. In example 7, a TPO was prepared using elastomer 6-1 as an impact modifier. Example 8 is essentially the same except that a portion of the elastomer was replaced with Compatabilizer A. As seen in Table VI, Example 7 exhibits poor impact properties. Example 8, however, exhibits improved impact.

Examples 9 and 10 are similar to examples 7 and 8 with the exception that Elastomer 7-2 is used in lieu of Elastomer 6-1. Again, the formulation with the compatabilizer exhibited improved impact strength and melt flow when compared to the control formulation.

Example 11 shows a control formulation using a linear/blocky ethylene propylene copolymer (V 878) as the modifier. The impact strength of this TPO compound is low. Example 12 shows a composition similar to Example 11, wherein 5% of the compatibilizer B is used as substitute for V 878. This composition shows marginally improved impact properties over Example 11. When compared to Example 8, containing the branched EPDM polymer 6-1, the impact improvement seen in Example 12 is inadequate. These examples illustrate that the combination of branched EPDM impact modifier and EPR compatibilizer is key for substantial improvements in TPO impact properties.

Example 13 is another control formulation using Uniroyal Royalene® 521. Again, the impact properties are inferior to those achieved using the compatibilizer.

TABLE VI

TPO Compositions In 70 MFR iPP Homopolymer Matrix

| EXAMPLE | | 7 | 8 | 9 | 10 | 11 | 12 | 13 |
|---|---|---|---|---|---|---|---|---|
| PP 19062-002-001 (70 MFR) | wt % | 70 | 70 | 70 | 70 | 70 | 70 | 70 |
| Elastomer | | | | | | | | |
| 6-1 | | 30 | 25 | — | — | — | — | — |
| 7-2 | | — | — | 30 | 20 | — | — | — |
| Royalene ® 521 | | — | — | — | — | — | — | 30 |
| Vistalon ® 878 | | — | — | — | — | 30 | 25 | — |
| Compatabilizer | | | | | | | | |
| A | | — | 5 | — | 10 | — | — | — |
| B | | — | — | — | — | — | 5 | — |
| Irganox ® 1010 | | 0.2 | 0.2 | 0.2 | 0.2 | 0.2 | 0.2 | 0.2 |
| Notched Izod Impact | J/m | | | | | | | |
| 21° C. | | 70 | 583 | 80 | 524 | 128 | 145 | 64 |
| −30° C. | | 38 | 75 | 43 | 70 | 54 | 59 | 43 |
| Gardner Impact @ −29° C. | J | | (+) | | | | | (+) |
| Total Energy | | 3.4 | >40 | | 24 | 29 | 34 | |

TABLE VI-continued

TPO Compositions In 70 MFR iPP Homopolymer Matrix

| EXAMPLE | | 7 | 8 | 9 | 10 | 11 | 12 | 13 |
|---|---|---|---|---|---|---|---|---|
| Failure Type | | B | D | B | B/D | B/D | D | B |
| Flexural Modulus @ 0.5 in/min | MPa | | | | | | | |
| 1% Secant | | 1000 | 931 | 1041 | 779 | 965 | 910 | 945 |
| Tangent | | 1041 | 972 | 1096 | 814 | 1007 | 945 | 965 |
| Tensile Strength @ 51 mm/min | | | | | | | | |
| Yield | | 6.8 | 7.3 | 6.8 | 7.3 | 7.6 | 7.5 | 7.0 |
| Break | | 5.5 | 5.5 | 4.9 | 6.5 | | 5.5 | 4.7 |
| Elongation @ 51 mm/min | % | | | | | | | |
| Yield | | | 12 | 8 | 18 | 14 | 17 | 11 |
| Break | | | 294 | 92 | 966 | 318 | 510 | 101 |
| Melt Flow Rate | g/10 min | 22.2 | 21.6 | 19.2 | 24.1 | 24.2 | 25.8 | 24.8 |
| Mold Shrinkage | % | 1.25 | 1.26 | 1.20 | 1.17 | 0.97 | 1.11 | 1.11 |

(+): Instrumented impact test data, −30° C. and 5 MPH.
B = Brittle    D = Ductile    B/D = Combination Brittle & Ductile

EXAMPLES 14 TO 18

Examples 14 to 18 show the effect of ethylene content in the compatibilizer on TPO properties. As shown in Table VII, as ethylene content decreases, both Izod impact and Gardner impact strengths decrease.

TABLE VII

Effect of Compatabilizer Ethylene content on TPO properties

| | | 14 | 15 | 16 | 17 | 18 |
|---|---|---|---|---|---|---|
| PP 19062-002-001 (70 MFR) | wt % | 70 | 70 | 70 | 70 | 70 |
| Elastomer 6-1 | | 30 | 25 | 25 | 25 | 25 |
| Compatabilizer | | | | | | |
| C | | — | 5 | — | — | — |
| D | | — | — | 5 | — | — |
| E | | — | — | — | 5 | — |
| F | | — | — | — | — | 5 |
| Irganox ® 1010 | | 0.2 | 0.2 | 0.2 | 0.2 | 0.2 |
| Notched Izod Impact | J/m | | | | | |
| 21° C. | | 75 | 578 | 583 | 166 | 155 |
| −30° C. | | 48 | 75 | 91 | 54 | 54 |
| −40° C. | | 59 | 102 | 86 | 75 | 70 |
| Gardner Impact @ −29° C. | J | | | | | |
| Total Energy | | 6.8 | >36 | >36 | 28 | — |
| Failure Type | | SB | D | D | D/DB | — |
| Flexural Modulus @ 13 mm/min | MPa | | | | | |
| 1% Secant | | 1041 | 917 | 958 | 1000 | 1027 |
| Tangent | | 1103 | 945 | 986 | 1034 | 1055 |
| Tensile Strength @ 51 mm/min | MPa | | | | | |
| Yield | | 17.3 | 7.5 | 7.6 | 7.7 | 7.7 |
| Break | | 12.8 | 6.0 | 5.9 | 5.5 | 6.1 |
| Elongation @ 51 mm/min | % | | | | | |
| Yield | | 9 | 13 | 12 | 11 | 12 |
| Break | | 37 | 630 | 697 | 93 | 640 |
| Melt Flow Rate | g/10 min | 18.3 | 16.8 | 16.3 | 17.1 | 15.7 |
| Mold Shrinkage | % | 1.23 | 1.10 | 1.13 | 1.14 | 1.14 |

SB: Shatter-Brittle
D: Ductile
DB: Ductile Brittle

TPO Morphology

The morphology of a series of TPO samples were examined using both LVSEM and TEM. For LVSEM analysis, thin sections of the sample were cut from injection molded specimens. The sections were obtained along the flow direction. These specimens were stained with $RuO_4$ prior to analysis.

For TEM analysis, the samples were cryomicrotomed at −100° C. These sections (70 to 100 nm) were vapor-stained for 2 to 3 days using 0.5 wt. % aqueous solution of $RuO_4$. Images were formed using 100 KV electrons in TEM.

Figure 1A:
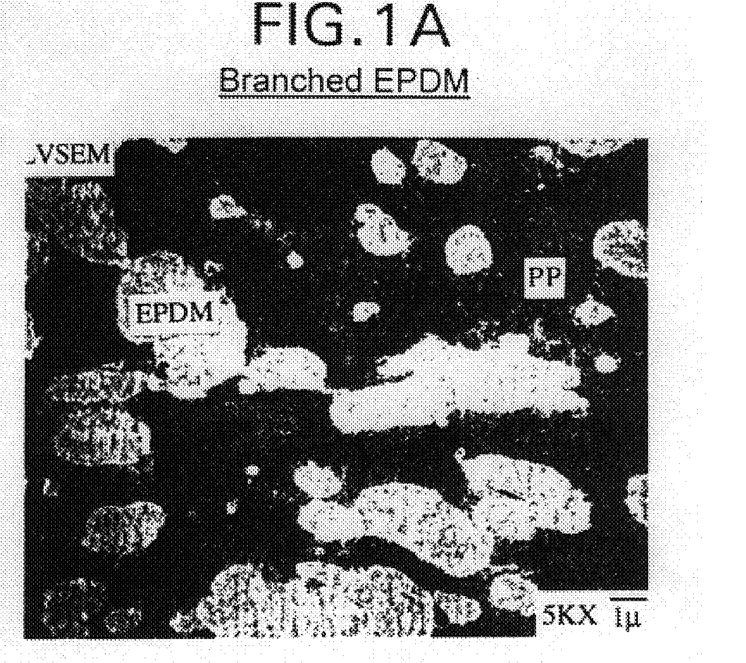
Figure 1B:
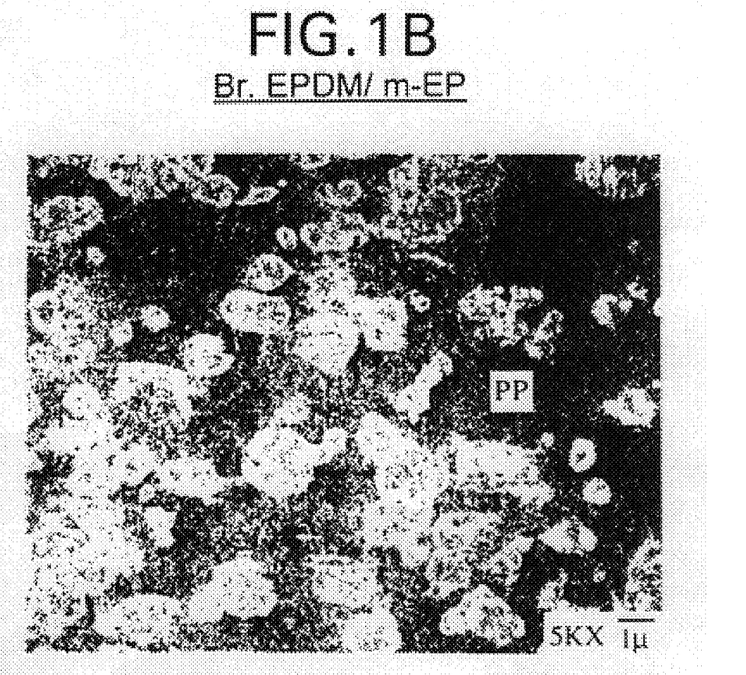

FIG. 1 shows the dispersion of the elastomer phase in a 70 MFR polypropylene matrix for compositions with and without the compatabilizer. From the LVSEM images, it is apparent that in the TPO compositions without the compatabilizer, the elastomer phase is uneven with particles >5 microns. In contrast, the TPO composition containing a compatabilizer exhibits good dispersion of the elastomer phase with a particle size of about 1 micron. Additionally, a very fine dispersion of the elastomeric phase is noticed in the TPO composition with the compatabilizer, which is not seen in the TPO composition containing the elastomer alone.

Figure 2A:
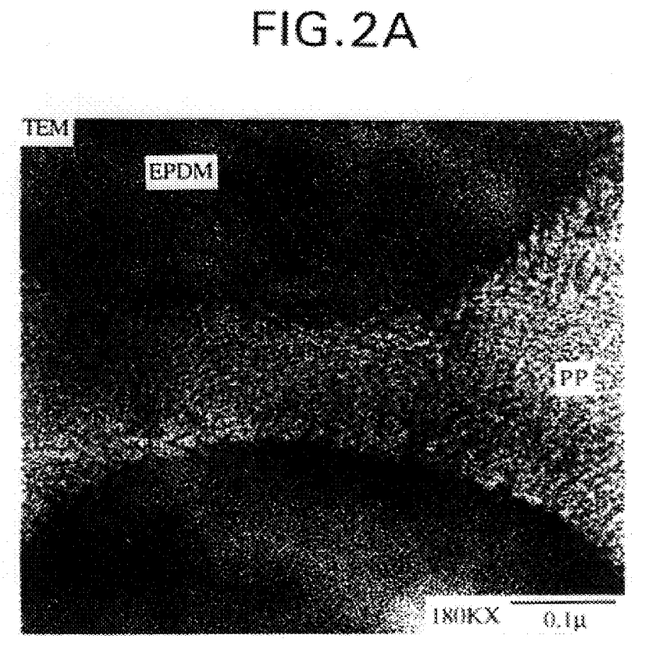
Figure 2B:
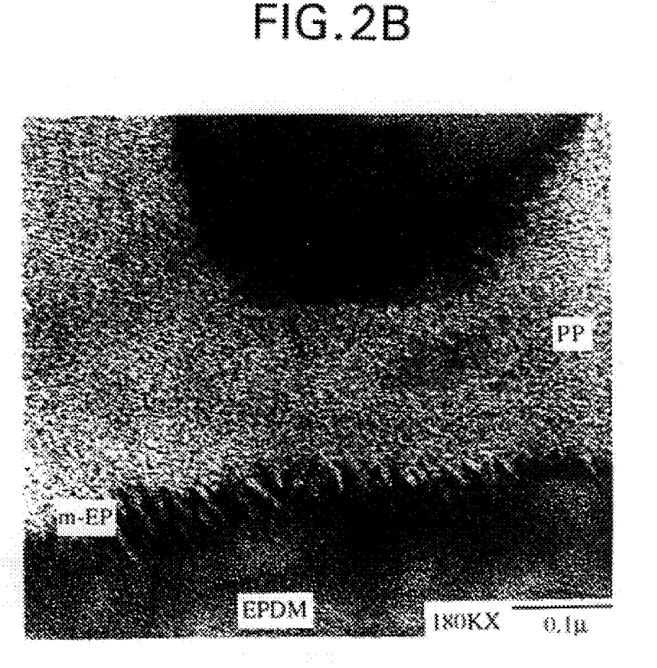

FIG. 2 shows TEM images of compositions with and without the compatabilizer. In the samples without the compatabilizer, the interface between the polypropylene and elastomer phases is distinct, with no interpenetration of the two phases. The TEM image of the compatabilizer containing TPO composition shows a halo between the polypropylene matrix and the elastomer phase as well as crystalline lamellae extending from the polypropylene phase into the elastomer phase. The inventors believe that the interface is occupied by the compatabilizer as shown by the image and that the interpenetration leads to improved interfacial adhesion resulting in improved impact properties.

Figure 3A:
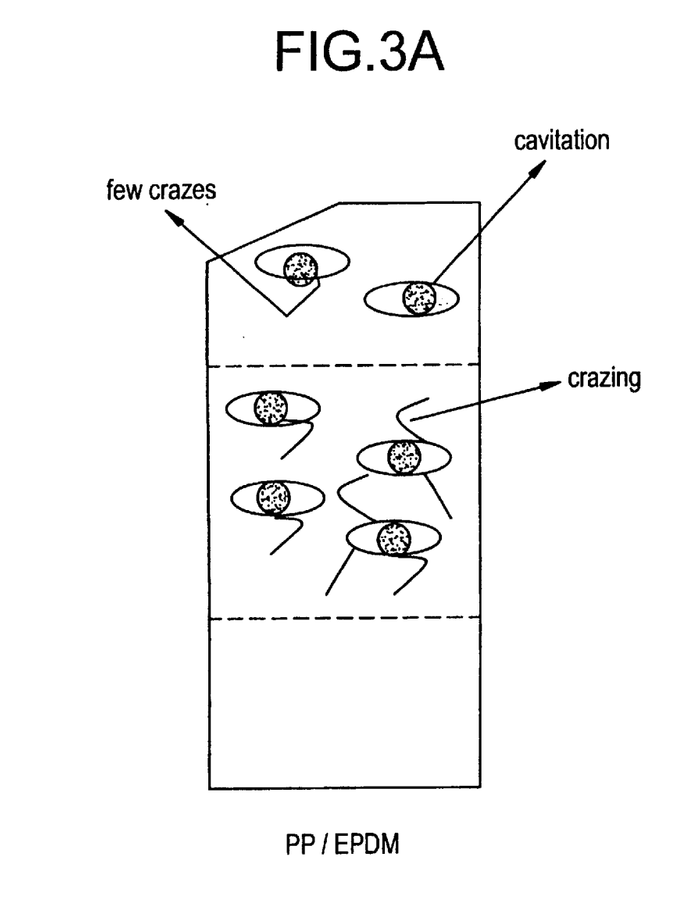
Figure 3B:
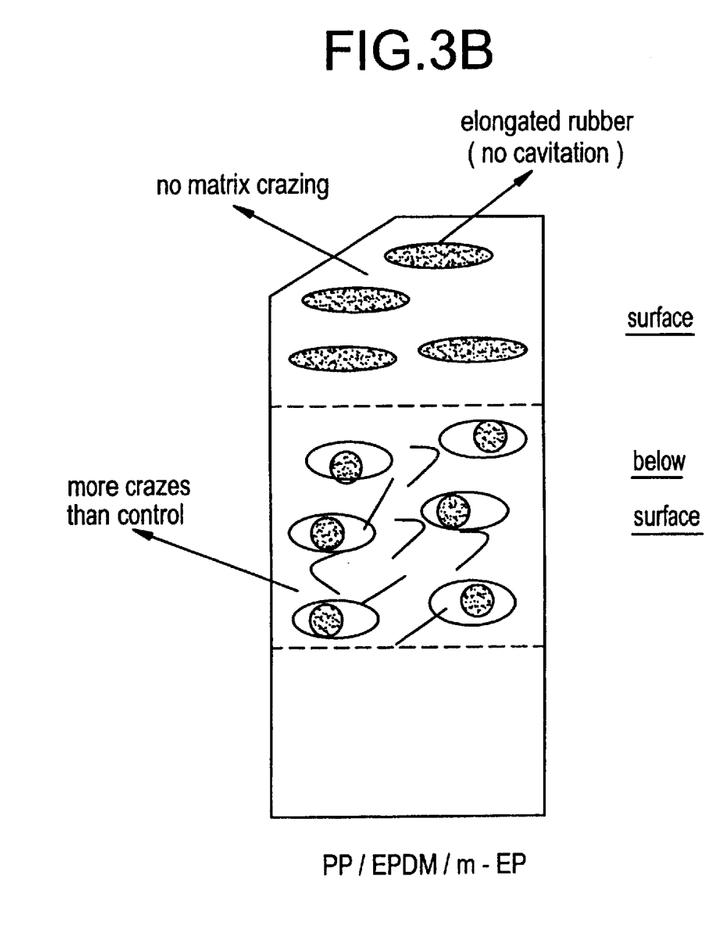
Figure 4A:
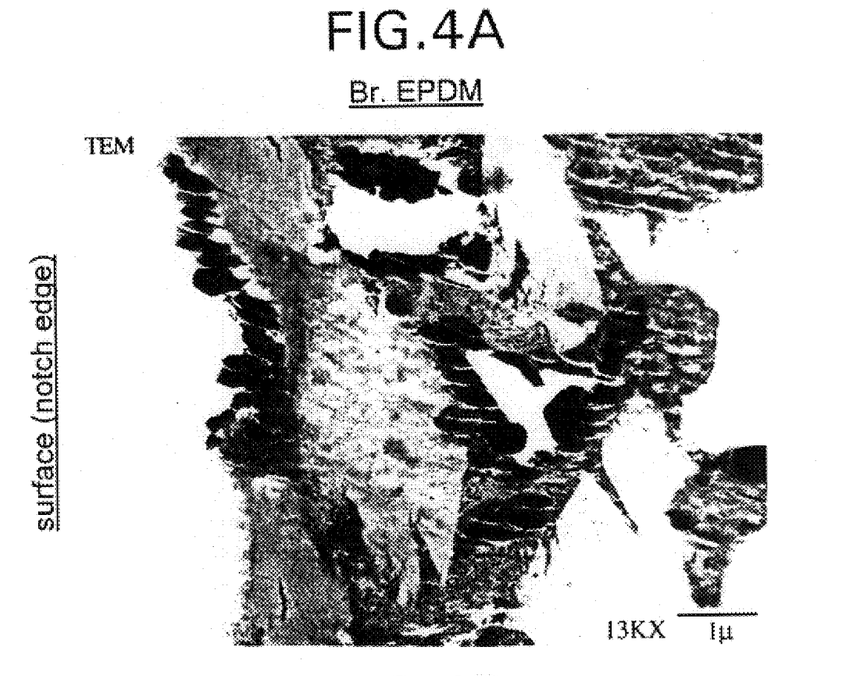
Figure 4B:
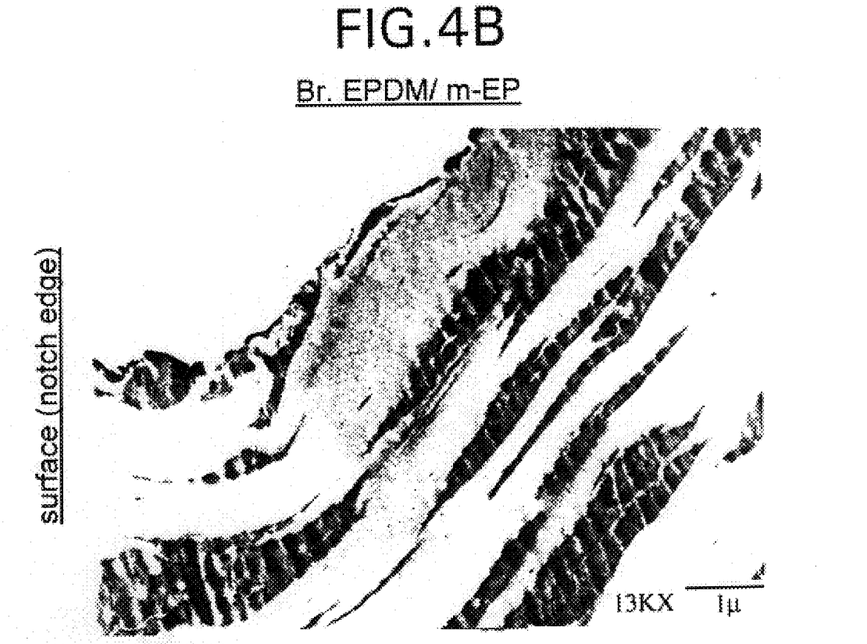
Figure 4C:
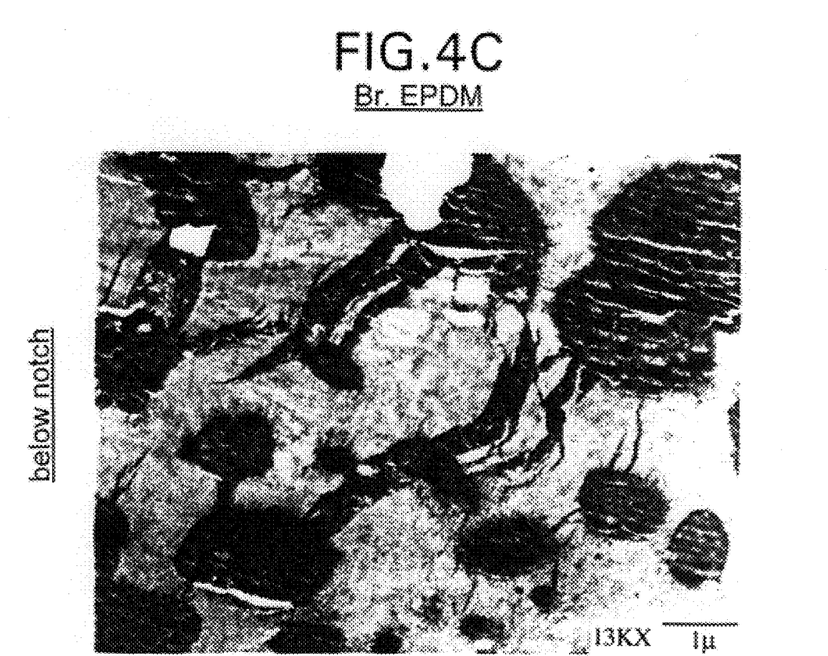
Figure 4D:
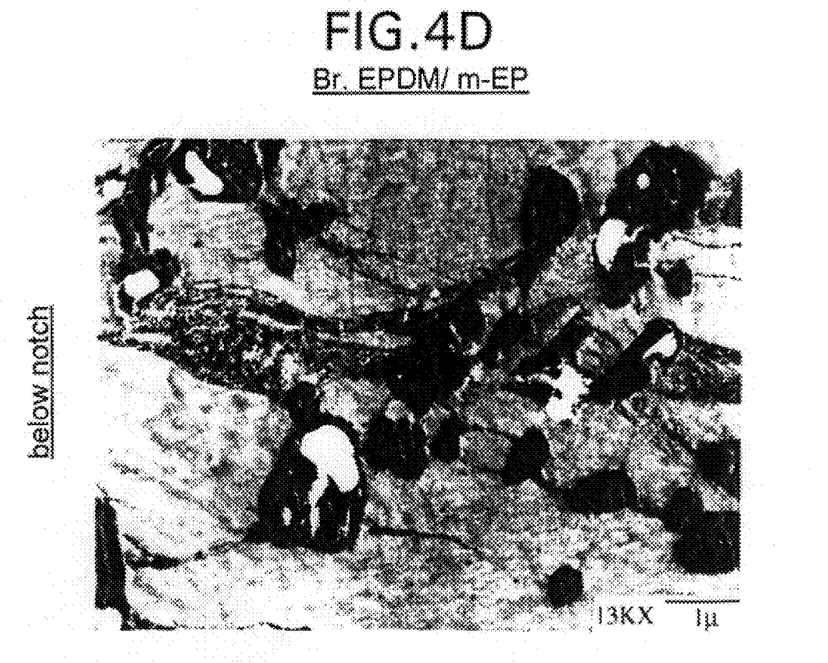

Studies have also been conducted to examine the fracture morphology of the failed Izod impact specimens to identify failure mechanisms in the TPO compositions both with and without compatabilizer. FIG. 3 shows a schematic of a section examined after fracturing the specimen. The top surface of the section contains the fracture plain and is included in the analysis. FIG. 4 shows the corresponding fracture micrographs from the TPO compositions with and without the compatibilizer.

In the compound formulated without the compatibilizer, the fracture mode is predominantly cavitation or void formation within the rubber phase (white domains seen inside the rubber particles correspond to rubber cavitation) with some indication of craze formation in the PP matrix.

The compound with the compatibilizer shows none of the above features near the notch KP. The region containing the notch has elongated rubber particles with no indication of cavitation. No crazes are formed in the PP matrix. Proceeding towards the bottom of the specimen, away from the notch surface, the failure mode is a combination of crazing and cavitation as observed in the control specimen.

We claim:

1. A thermoplastic olefin composition comprising:
   (a) 88 to 50 weight percent polypropylene, said polypropylene having a melt flow rate of at least 20 g/10 minutes as determined by ASTM D1238, condition L;
   (b) 10 to 50 weight percent elastomer wherein said elastomer is selected from the group consisting of ethylene-alpha olefin elastomers and ethylene-alpha olefin-diene elastomers; wherein said elastomer has an ethylene content that ranges from 90 to 45 weight percent;
   (c) 2 to 15 weight percent of a compatabilizer comprising an ethylene-propylene copolymer having a propylene content of at least 80 weight percent, wherein said compatabilizer has a molecular weight distribution of from 1.8 to 4.5 and further wherein said compatabilizer is produced using a metallocene polymerization catalyst.

2. The thermoplastic olefin composition according to claim 1 wherein the compatibilizer contains crystalline propylene segment.

3. The thermoplastic composition according to claim 1, wherein said elastomer comprises ethylene-propylene rubber.

4. The thermoplastic composition of claim 1, wherein said compatabilizer comprises an ethylene-propylene copolymer having at least 85 weight percent propylene.

5. The thermoplastic composition of claim 1, wherein said compatabilizer has a crystallinity of from 5% to 40% that of isotactic homopolypropylene.

6. The thermoplastic olefin composition of claim 1, wherein said compatabilizer has a number average molecular weight of from 40,000 to 300,000.

7. The thermoplastic olefin composition of claim 1, wherein said elastomer comprises ethylene octene copolymer.

8. A thermoplastic olefin composition comprising: 65–75 weight percent polypropylene, said polypropylene having a melt flow rate of at least 35 g/10 minutes as determined by ASTM D1238, condition L; 20 to 40 weight percent elastomer, said elastomer selected from the group consisting of ethylene-alpha olefin copolymer and ethylene alpha-olefin diene terpolymers, wherein said elastomer has an ethylene content that ranges from 90 to 45 weight percent; and a 3 to 7 weight percent compatabilizer comprising an ethylene-propylene copolymer having from 83 to 91 weight percent propylene, wherein said compatabilizer has a molecular weight distribution of from 2 to 3 and is produced using a metallocene polymerization catalyst.

9. The thermoplastic olefin composition of claim 8, wherein said elastomer comprises ethylene-propylene-diene terpolymers having a branching index of from 0.1 to 0.6.

10. The thermoplastic olefin composition of claim 8, wherein said compatabilizer has a number average molecular weight of from 80,000 to 200,000.

11. The thermoplastic olefin composition of claim 8, wherein said elastomer has a number average molecular weight of from 30,000 to 500,000.

12. The thermoplastic olefin composition of claim 8, wherein said compatabilizer has a crystallinity of from 5 to 40% as that of isotactic homopolypropylene.

13. The thermoplastic olefin composition of claim 8, wherein said elastomer comprises ethylene-propylene copolymer.

14. The thermoplastic olefin composition of claim 8, wherein said elastomer comprises ethylene-propylene-vinyl norbornene or ethylidene norbornene terpolymer.

15. The thermoplastic olefin composition of claim 1 wherein said compatabilizer copolymer is a random copolymer.

16. A process for preparing a thermoplastic olefin composition comprising combining components (a), (b) and (c) as defined in claim 1 and melt mixing said components at high intensity for a period of time sufficient to form a homogenous mixture.

* * * * *